United States Patent [19]
Bonifaci

[11] Patent Number: 5,725,918
[45] Date of Patent: Mar. 10, 1998

[54] CARDBOARD AND/OR PAPER BASED MULTILAYER MATERIAL

[75] Inventor: Luigi Bonifaci, Rome, Italy

[73] Assignee: The Procter & Gamble Company, Cincinnati, Ohio

[21] Appl. No.: 640,900

[22] PCT Filed: Dec. 13, 1994

[86] PCT No.: PCT/US94/14386

§ 371 Date: May 9, 1996

§ 102(e) Date: May 9, 1996

[87] PCT Pub. No.: WO95/16558

PCT Pub. Date: Jun. 22, 1995

[30] Foreign Application Priority Data

Dec. 16, 1993 [EP] European Pat. Off. ............ 93870234

[51] Int. Cl.$^6$ ................... B65D 5/56; B65D 5/52
[52] U.S. Cl. .......... 428/34.2; 428/36.7; 428/346; 229/3.1; 229/3.5 R; 156/69
[58] Field of Search ............... 428/34.2, 34.3, 428/513, 343, 346, 349, 36.7, 35.4; 229/3.1, 3.5 R; 156/69, 60; 426/127

[56] References Cited

U.S. PATENT DOCUMENTS

| | | | |
|---|---|---|---|
| 4,396,142 | 8/1983 | Lines, Jr. et al. | 428/34.2 |
| 4,537,815 | 8/1985 | Wise et al. | 428/34.2 |
| 4,789,575 | 12/1988 | Gibbons et al. | 428/34.2 |
| 4,981,739 | 1/1991 | Gibbons et al. | 428/34.2 |
| 5,167,994 | 12/1992 | Paulsen | 428/34.2 |
| 5,213,858 | 5/1993 | Tanner et al. | 428/34.2 |
| 5,326,021 | 7/1994 | Farrell et al. | 229/3.1 |
| 5,330,845 | 7/1994 | Andersson et al. | 428/487 |
| 5,383,835 | 1/1995 | Gordon et al. | 493/330 |
| 5,415,910 | 5/1995 | Kuauf | 428/34.3 |
| 5,506,011 | 4/1996 | Farrell et al. | 428/513 |

*Primary Examiner*—Rena Dye
*Attorney, Agent, or Firm*—Ronald W. Kock

[57] ABSTRACT

The present invention relates to multilayer materials for reforming into package containers with state of the art glues, which adequately protect moisture sensitive compounds and prevent the migration through the wall of greasy compounds. This material is particularly suitable for making containers for dry laundry and household cleaning compositions.

2 Claims, 2 Drawing Sheets

CARDBOARD AND/OR PAPER BASED MULTILAYER MATERIAL

BACKGROUND OF THE INVENTION

A wide variety of single-use type packaging materials are known, the so-called disposable cartons. Many of said packaging materials are in the form of multilayers comprising different materials in order that the composite material may present a desired combination of properties otherwise not available from a single layer of a single composition.

For packaging cartons, known multilayers generally comprise at least one stiffening layer, such as cardboard, which also reliably retains scores and folds therein. The other layers can be variably chosen in function of the protection needed for the contained material. In particular, for dry laundry compounds, which sometimes are moisture sensitive compositions, the disposable cartons consist of a multilayer material comprising generally an aluminum foil coated to cardboard or paper.

The disposable cartons comprising a layer of aluminum foil possess extremely barrier properties. However, this type of multilayers is becoming more and more controversial from the environmental viewpoint.

Consequently, the packaging technology has long been in need of being able to develop an aluminum-free packaging material, that uses materials offering high barrier characteristics, but conferring greater environmental advantages to the multilayer material.

From CH-A5-610 570 it is known that ethylene vinyl alcohol copolymer (abbreviated as EVOH) or mixtures of EVOH with other thermoplastic polymers is a good barrier material for gases in general, oxygen in particular. This material is directly used to preserve liquids or foods in general.

Various multilayer materials comprising EVOH and mixtures thereof have been described in EP-A-245 921, Gibbsons et al., published Nov. 19, 1987; EP-A-423 511, L öfgren et al., published Apr. 24, 1991; WO92/01558, Flom, Atle, published Feb. 6, 1992. The containers formed by these multilayer materials present several layers to achieve different protection of the contained material, from an oxygen barrier to a flavour barrier, always comprising at least a stiffening layer made of cardboard or paper. The EVOH or other thermoplastic polymers are laminated always as one of the outermost layers.

The multilayer materials of this prior art needs special assembling techniques, such as heat sealing or hot melts, to be formed into cartons. In this operation, different parts of said material must be assembled. If the parts, which have to be bonded together, consist of EVOH or mixtures thereof or of other thermoplastic polymers, the carton cannot be simply glued together, but needs, as said before, sophisticated assembling techniques.

It is an object of the present invention to provide a multilayer material, which allows to form packing containers for dry compounds, such as dry laundry compositions, on machines using only glues as adhesives, and nevertheless present a high barrier to moisture permeation and prevent the migration through said material of greasy compounds using an EVOH layer.

It is yet another independent object of the present invention to provide a process allowing for the manufacture of the packaging container from said multilayer material. These and other objectives will become more apparent in the following description of the invention.

BRIEF DESCRIPTION OF THE FIGURES

In FIG. 2 only one tie layer is used, whereas in FIG. 3 the EVOH layer is directly attached between two cardboard or paper layers.

SUMMARY OF THE INVENTION

Figure 1:
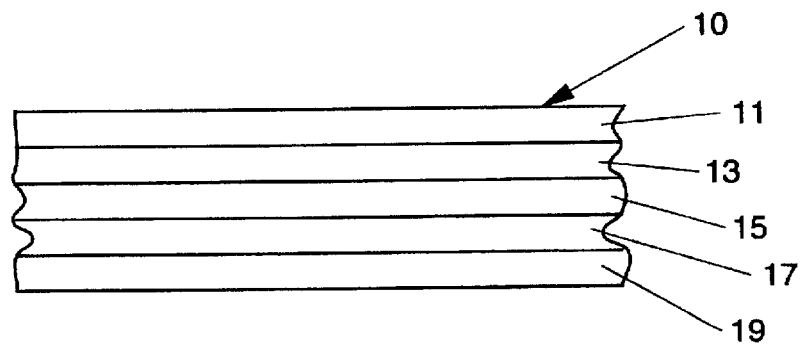
FIG. 1 schematically illustrates the transverse structure of the preferred embodiment of the multilayer material according to the present invention: the ethylene vinyl alcohol copolymer (EVOH) layer is first sandwiched between two tie layers and then sandwiched again between two cardboard or paper layers.

The present invention is a multilayer material for making packages adequate for containing dry materials, which exhibits a superior moisture protection and prevents the migration of greasy compounds through an ethylene vinyl alcohol copolymer (EVOH) barrier layer.

The multilayer material of the present invention uses state of the art glues for reforming into a packaging container, and not, as more commonly, heat sealed, since the outermost layers are always made of cardboard or paper.

DETAILED DESCRIPTION OF THE INVENTION

The multilayer of the present invention uses at least two different materials: cardboard or paper and ethylene vinyl alcohol copolymer (EVOH). These materials are available as layers in different thicknesses and density, which determine the weight proportions of the different layers. The ranges described below in the examples for the various materials refer for a container of a dry laundry compound. The ranges that will be mentioned are nevertheless variable for different needs any person skilled in the art can encounter to solve specific problems. These various layers are attached to each other in a variable sequence except that cardboard or paper should always be the outermost layers, described below with the aid of the drawings, and various adhesion techniques.

The thicknesses of the cardboard and paper layers can be chosen freely from any person skilled in the art as mentioned before. The thickness of the cardboard determines the stiffness of the material and compression resistance of the final carton, whereas the thickness of the paper can depend from the printing or pre-printing quality to achieve. For the following examples of the present invention of a multilayer, the proportion amounts preferably between 75% and 80%, for the cardboard layer of the total weight of said multilayer and preferably between 10% and 20%, for the paper layer of the total weight of said multilayer material are representative measures, but not at all unique. The cardboard or paper layer can in addition show a white outer-liner allowing a high quality printing.

The tie layer is principally used to strengthen the adhesion of the ethylene vinyl alcohol copolymer barrier layer onto the cardboard or paper layer. Said layer also provides a protection to the EVOH layer against mechanical or environmental damages. The tie layer can be of many different kinds for example polyethylene. To achieve this tasks, they can be properly used in various thickness and density as selected by any person skilled in the art of packaging.

The EVOH material is needed to substitute the aluminum foil as a moisture barrier. The thickness and the density of this layer is variable to any different needs of a person skilled in the art. For the following examples of the present invention of a multilayer, the thickness should be of 3 µm minimum and the percentage of Ethylene could be varied successfully from 20 to 50% on a weight basis of the EVOH material. The density of the EVOH material used is between from 1.1 to 1.3 g/cm³.

Any of the thickness or density ranges mentioned so far do not limit the present invention of a multilayer, because they can be easily varied by any person skilled in the art. All possible coating methods to attach the different layers of the multilayer material of the present invention are all known and common for any person skilled in the art. The present invention is applicable with any coating method the person skilled in the art chooses. The present invention is applicable also to any other non-heat-sealing method capable of achieve a sufficient tight attachment of the layers of the multilayer material.

The production of this multilayer is done on coating machines. The cardboard is unwinded and the inner layers of polymers are applied. Then the paper is unwinded on top and the formed sandwich goes through a series of pressing, and eventually cooling cylinders to allow the adhesion phenomenon to occur.

The EVOH layer can be either extruded, i.e. applied in a molted state (extruded), or laminated, i.e applied in a solid state (film). In the first case, the use of tie layers can strengthen the adhesion, whereas in the second case, the use of tie layers or adhesives is a necessity.

The multilayer material of the present invention represents a barrier board for moisture sensitive compounds or products releasing olefins likely to migrate in the board. Moisture can chemically degrade some compounds or drastically change their physical characteristics, e.g. agglomerating powders in lumps. The migration of grease can stain the pack and considerably decrease its mechanical resistance. It can also jeopardize it shelf appearance. The material here disclosed is particularly suitable to manufacture packages for dry laundry compositions.

Nevertheless, since the outertmost layers of said material are cardboard or paper layers, the different parts of the container formed from said material can be tightly bonded together with state of the art glues, for example vinylic glues. The high commercial importance of this invention resides in the fact that, since the packaging container is glued together, conventional carton erecting machines can be used, i.e. machines for erecting packaging material only made of cardboard.

Figure 4:
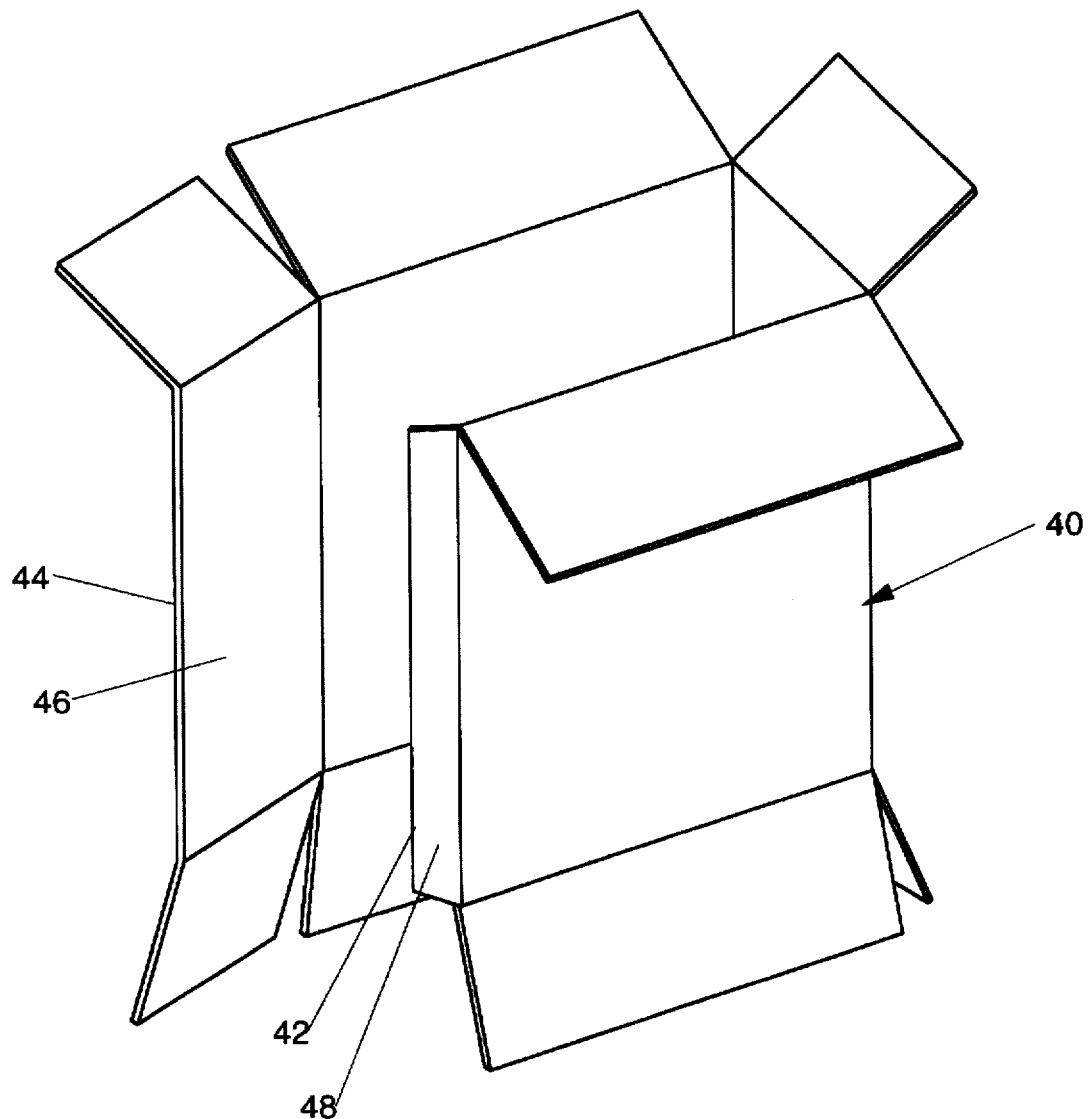
FIG. 4 schematically illustrates the preferred embodiment of the packaging container made of one blank composed of said multilayer material.

The packaging container of the invention is made from one blank composed of said multilayer material, as schematically illustrated in FIG. 4. Said blank (40) is reformed into a packaging container by gluing the appropriate edges (42) and (44) together. One of the outermost part of one of the edges (46) of said blank is glued on the opposite outermost part of the other edge (48) of said blank.

The container top and bottom can be closed following the same principle of gluing the internal side of one flap onto the external part of the opposite flat.

The so formed container composed of said multilayer is adequate to contain any dry material, which is sensitive to moisture or likely to release grease. In particular, said container is adequate to contain dry compounds such as Sodium percarbonate, Sodium perborate and olefin. Such compounds are typically present in laundry and household cleaning and bleaching compositions. Its use could be envisaged as well for other products of similar sensitivities e.g food flakes.

EXAMPLE I

The preferred version of the present invention of a multilayer material is illustrated in FIG. 1 through the transverse structure of the multilayer (10) that is reformable into a disposable carton. In this case the ethylene vinyl alcohol copolymer layer (EVOH) (15) is coated, preferably extruded, in between two tie layers (13) and (17), on the board/paper. The thickness of said EVOH layer must be at least 3 µm. Any person skilled in the art of packaging can select the tie layer grade and amount as a function of the desired adherence and economical constraints. For example, the preferred version of the present invention uses a combination of polyethylene and Bynel®, the thickness of each layer ranging from 5 to 10 µm.

Following cardboard-paper combinations of the outermost layers (11) and (19) are possible in the present invention:

a) (11)=cardboard and (19)=cardboard;

b) (11)=cardboard and (19)=paper;

c) (11)=paper and (19)=paper;

All these possible variations of the outermost layer of cardboard or paper, mentioned in the items a) to c), are applicable to all other examples described in the following of the multilayer material of the present invention. These outermost layer of cardboard or paper of the multilayer of the present invention are interchangeably the outer or the inner part of the reformed container in all examples.

EXAMPLE II

Figure 2:
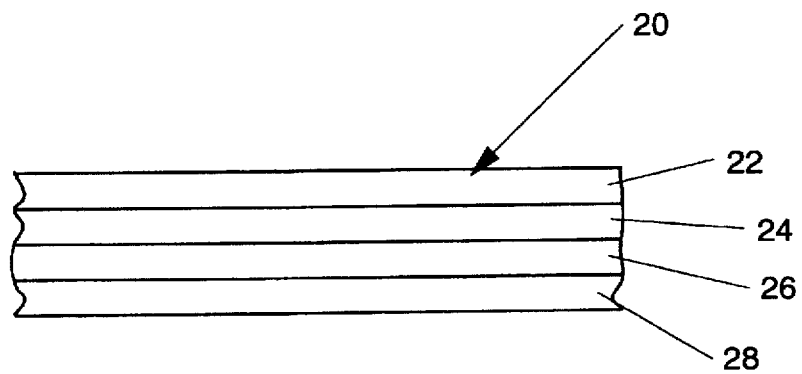
FIG. 2 and 3 show possible modifications of the corresponding transverse structure of the multilayer material.

In FIG. 2 the EVOH barrier layer (26) is coated preferably extruded together with one tie layer only (24), in between the paper and the cardboard (22) which represents the outer or inner part of the formed packing container. The EVOH barrier layer thickness (26) must be at least 3 µm.

EXAMPLE III

Figure 3:
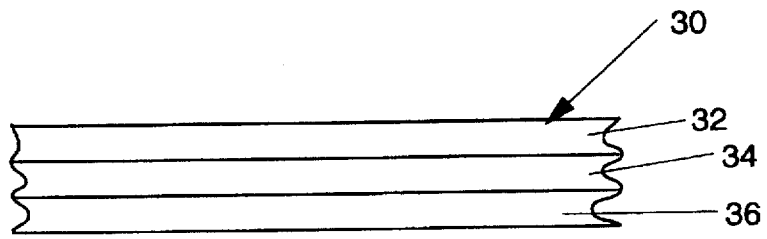

The last possible sequence of the multilayer material of the present invention is illustrated in FIG. 3. The multilayer (30) shows no tie layer, but consists only of an EVOH barrier layer (34) directly coated, preferably extruded, directly onto the two cardboard or paper layers (32) and (36).

I claim:

1. A packaging container made from one blank comprising a multilayer material having two layers of paper and a layer of ethylene vinyl alcohol copolymer attached between said two layers of paper by at least one tie layer, said two layers of paper being outermost layers of said blank, said container being formed by gluing two edges of said blank such that one of said outermost layers at one edge is glued to an outermost layer at another edge.

2. The packaging container according to claim 1 characterized in that said paper includes cardboard.

* * * * *